Nov. 13, 1962
E. T. SKANTAR
3,063,756
AIR SUPPLY ARRANGEMENT FOR AIR SPRING SUSPENSION
SYSTEM OF RAILWAY CARS
Filed Aug. 25, 1958
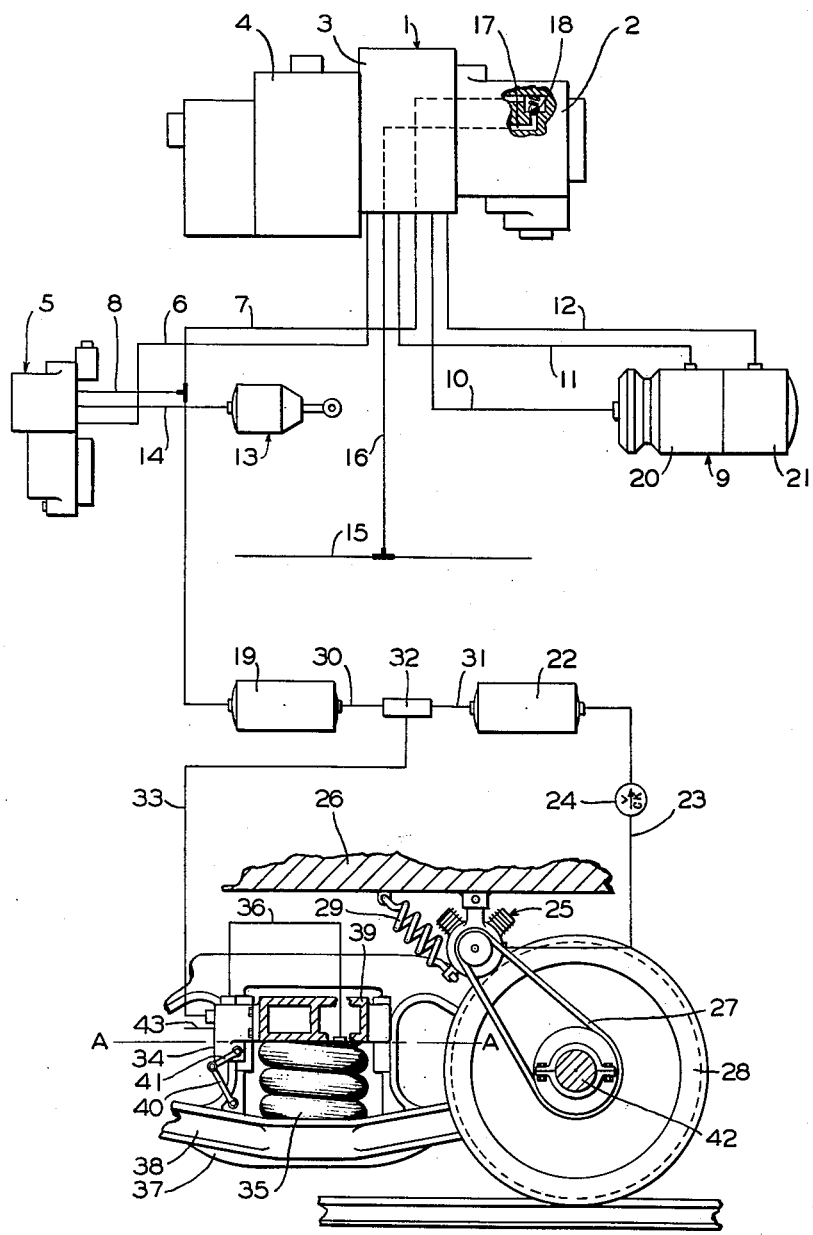
INVENTOR.
Elmer T. Skantar
BY
Adelbert A. Steinmiller
Attorney

United States Patent Office 3,063,756
Patented Nov. 13, 1962

3,063,756
AIR SUPPLY ARRANGEMENT FOR AIR SPRING SUSPENSION SYSTEM OF RAILWAY CARS
Elmer T. Skantar, Pitcairn, Pa., assignor to Westinghouse Air Brake Company, Wilmerding, Pa., a corporation of Pennsylvania
Filed Aug. 25, 1958, Ser. No. 756,755
2 Claims. (Cl. 303—5)

This invention relates to air supply arrangements for air spring suspension systems for railway cars, and, more particularly to an arrangement whereby the air supply for the air spring suspension system is normally provided from an independent source but may be supplied from a source in the air brake system when the pressure of the independent source falls below that of the air brake source.

In some of the presently known arrangements, the sole source of supply for air pressure for the air springs of the suspension system is the brake pipe of the air brake system. There are several reasons, however, which might make such an arrangement undesirable. For example, should the air springs on several of the cars require air concurrently, it is conceivable that such a concentrated pressure demand thus placed on the brake pipe would be so excessive as to cause sufficient brake pipe pressure reduction to effect an untimely and undesirable brake application. On the other hand, to rely solely on some other independent source of fluid pressure such as a compressor operated by motion of the vehicle over the right of way either by oscillation of the sprung portion of the vehicle or rotation of the vehicle wheel, could prove to be unsatisfactory also. For example, when a car is coupled to the train, the air springs as well as the reservoir charged by the compressor might be void of pressure, and since no air pressure would be available for charging said air springs until the car has been in motion for some time, the car would have to ride over the right of way without benefit of air spring suspension until such time as would be necessary to charge the reservoir and the air springs. Under such undesirable conditions damage might result to the vehicle or at least undue jarring of the car body and truck would occur.

Accordingly, the primary object of the present invention is to provide an air supply arrangement for the air spring suspension system of a railway type vehicle whereby air supply for the air springs in the system is assured at all times without placing an excessive pressure demand on the air brake system supply source.

An arrangement for supplying air to the air springs of an air spring suspension system and constituting the present invention comprises a reservoir charged with fluid under pressure supplied from the brake pipe of the air brake system and an alternate reservoir charged independently by a compressor driven by the motion of the railway car over the right of way with a double check valve arranged between the two reservoirs for selectively permitting flow of fluid under pressure from one or the other, depending upon which pressure predominates, to a supply conduit leading to a load-responsive regulating valve controlling the pressure in the air springs, thereby reducing to a minimum any excessive fluid pressure demand on the air in the brake system. The leveling valve device interposed in the conduit leading to the air spring maintains the appropriate degree of pressure in the air springs for maintaining the sprung portion of the vehicle at a constant level.

The single FIGURE drawing is a schematic view showing the air supply arrangement embodying the invention.

Referring to the drawing, the apparatus, as shown, comprises a brake control valve device 1 of the well-known Westinghouse D–22 type such as disclosed in U.S. Patent 2,152,257. Valve device 1 consists of a service portion 2, a pipe bracket portion 3, and an emergency portion 4. The apparatus further comprises a relay valve device 5, of any well-known type, connected to the valve device 1, through the pipe bracket portion 3, via a control pipe 6, a supply pipe 7 and a branch pipe 8, and a combined displacement-auxiliary-emergency reservoir unit 9 connected to the valve device 1, through the pipe bracket portion 3, via pipes 10, 11 and 12, respectively. A brake cylinder device 13 is connected to the delivery port of relay valve device 5 via a pipe 14. Also shown in the drawing is a portion of a train brake pipe 15 connected by a branch pipe 16 to the brake control valve device 1.

A detailed description of the structures and functions of the brake control valve device 1, the relay valve device 5, the reservoir unit 9 and the brake cylinder device 13 is not deemed essential to an understanding of the invention, and, therefore, such description has been intentionally omitted herein. The devices immediately above-mentioned are shown, in outline, in the drawing merely for the purpose of illustrating one method of arranging applicant's invention in a typical air brake system, it being understood that said air brake system need not be limited to the particular one shown.

For purposes of the present invention it is important merely to note that the brake control valve device 1 provides a communication 17, including a check valve 18, which permits flow of fluid under pressure from brake pipe 15 to supply pipe 7 leading to a supply reservoir 19 and prevents flow in the reverse direction. By way of a very brief operational description, the brake control valve device 1 comprises valve means (not shown) responsive to charging of brake pipe 15 with fluid under pressure at the locomotive to supply fluid under pressure, via pipe 11, to an auxiliary reservoir 20 of the reservoir unit 9 and, via pipe 12, to an emergency reservoir 21 of said reservoir unit for charging said reservoirs at a pressure equal to that in the brake pipe. The valve means (not shown) in the control valve device 1 is further responsive to a service rate of reduction of fluid pressure in the brake pipe 15 for effecting supply of fluid under pressure from the auxiliary reservoir 20 to control pipe 6 for piloting operation of the relay valve device 5 to effect supply of fluid to the brake cylinder device 13 from the supply reservoir 19 at a pressure proportional to the pilot pressure supplied to the relay valve device, and is responsive to an emergency rate of reduction of fluid pressure in said brake pipe for effecting supply of fluid under pressure from both the auxiliary reservoir 20 and the emergency reservoir 21 to control pipe 6 at a high degree of pressure for piloting operation of relay valve device 5 to effect supply of a correspondingly higher fluid pressure from supply reservoir 19 to the brake cylinder device. In each case the relay valve device 5 operates to supply fluid from the supply reservoir 19, via pipes 8 and 14, at a pressure proportional to the pressure of fluid established in control pipe 6.

While it is preferable that the supply reservoir 19, which is the storage reservoir for fluid under pressure for operating the brake cylinder device 13, be used in the arrangement embodying the invention, it should be understood that, if desired, a separate reservoir, charged directly from the brake pipe through a check valve and by-passing the control valve device 1, may be used.

In accordance with the invention, a second storage reservoir 22, charged with fluid under pressure independently of the air brake system, provides another source of fluid pressure for the air spring suspension system. Reservoir 22 is charged via a conduit 23, in which a check valve 24 is interposed for preventing reverse flow, by a compressor 25 suspended from a sprung portion 26 of the vehicle and driven through a belt 27 from the axle of the vehicle wheel 28 as the vehicle moves over the right of way. If desired, any other suitable compressor means may be employed, such as an oscillation type pump driven by the slight bouncing motion of the vehicle body, for charging the reservoir 22. In the arrangement shown, a spring 29 having one end attached to the compressor 25 and the other end attached to the unsprung portion 26 serves to maintain proper tension on the drive belt 27. Reservoirs 19 and 22 are selectively connectable through respective conduits 30 and 31 and a double check valve 32 to a conduit 33 leading to a leveling valve device 34.

The leveling valve device 34 is a component of a typical air spring suspension arrangement comprising, in addition to said leveling valve device, an air spring 35 connected via a conduit 36 to said valve device. The air spring 35 rests on a spring pad 37 carried by a wheel-truck side frame 38 of the railway vehicle, said side frame constituting an unsprung portion of the vehicle, while a bolster 39, which supports the center sill (not shown) of the vehicle, rests on said air spring and constitutes a sprung portion of the vehicle to which the leveling valve device 34 is fastened. Relative movement between the sprung portion 39 and the unsprung portion 38 is reflected through a pair of pivotally connected levers 40 and 41, one (40) of said levers being pivotally anchored to the truck side frame 38, while the other (41) is operatively connected to a rotary operating shaft of the leveling device 34.

The air spring 35 and the leveling valve device 34, details of which are not deemed necessary to be shown for purposes of the present invention, are of the usual type and operate in the usual manner to maintain the bolster 39, and therefore the sprung portion of the vehicle, at a preselected height relative to axle 42 on which the wheel 28 is mounted, said preselected height being indicated by the line A—A in the drawing coinciding with the upper surface of the air spring as shown. For a predetermined degree of fluid pressure in the air spring 35, said spring supports a given load at such a level that the bolster 39 assumes a normal position or level indicated by line A—A. An increase in vehicle load causes the spring 35 to be compressed and thereby causes relative movement of the levers 40 and 41, such movement being effective for operating the leveling valve device 34 to establish a communication (not shown) in said valve device between conduits 33 and 36, whereby fluid pressure from pipe 33 as supplied from either the supply reservoir 19 or the independent supply reservoir 22, as will later be described, may flow to the air spring to increase the degree of pressure therein and expand the spring to raise the sprung portion of the vehicle until the bolster attains its normal position at the level of line A—A, as shown in the drawing. When the bolster 39 attains its normal level, valve means (not shown) in the leveling valve device 34 is restored to lap position and thereby maintains the necessary pressure in the air spring 35 to maintain the bolster 39 in its normal position. If the load on the vehicle is decreased, fluid pressure in the air spring 35 will expand said air spring to lift the bolster above its normal level, thereby causing relative movement of the levers 40 and 41. Upon such relative movement, lever 41 is effective for operating the leveling valve device 34 to cut off the supply communication between conduits 33 and 36 and to open said conduit 36, and therefore the air spring, to an atmospheric exhaust 43 to relieve fluid pressure from said air spring until the bolster 39 is back down to its normal level, at which point said leveling valve device operates to lap position, as above noted, to maintain said bolster at said normal level until a further change in the vehicle load occurs.

The double check valve device 32 is so arranged between the reservoirs 19 and 22 as to selectively control flow of fluid under pressure from one reservoir or the other, depending upon which pressure is predominant. For example, when a car is coupled to the train, the air spring 35 and the reservoir 22 may be void of fluid pressure. The double check valve device 32, however, permits fluid pressure to flow from reservoir 19 in the air brake system to the air spring 35, assuming that said reservoir has been charged from the brake pipe 15. The leveling device 34 and the air spring 35 then operate, as above described, to lift the bolster 39 up to and maintain it at normal level. After the train has moved over the right of way for an appropriate distance, the compressor 25 will have charged the reservoir 22 to a degree of pressure adequate for maintaining the air spring. Though not shown, the compressor 25 is provided with a governor which operates in the well-known manner for maintaining the pressure of fluid in the reservoir 22 within a predetermined operating range, the lower limit of which is at some predetermined degree of pressure higher than the degree of pressure normally maintained in reservoir 19 from the brake pipe 15. Therefore, once the reservoir 22 has thus been charged, and as long as the pressure therein remains within the operating range, any further demand of fluid pressure for the air springs will be provided therefrom, as effected by operation of the double check valve device 32, the shifting of the valve element of which cuts off the supply of fluid under pressure from reservoir 19 and connects pipe 31 to pipe 33.

The purpose of such an arrangement is to insure use of fluid pressure from reservoir 22, so long as such pressure is available, in preference to the pressure from reservoir 19 since it is desirable to conserve the pressure in the latter reservoir for braking purposes.

Having now described the invention, what I claim as new and desire to secure by Letters Patent is:

1. An arrangement for supplying fluid under pressure to an air spring suspension system of a railway vehicle having a sprung portion, an unsprung portion and an air brake system including a brake pipe normally charged with fluid under pressure, said arrangement comprising, in combination, a first reservoir connected to said brake pipe and charged by fluid under pressure therefrom, a second reservoir, a fluid compressor carried by said vehicle and operable by travelling motion of the vehicle for charging said second reservoir with fluid at a pressure normally greater than the pressure in said first reservoir, air spring means for resiliently supporting said sprung portion in vertically spaced relation to said unsprung portion, conduit means to provide for flow of fluid under pressure to said air spring means from one or the other of said reservoirs, a double check valve device opposingly subject to the pressures in said first reservoir and said second reservoir and which operates responsively to the predominating pressure of fluid in either of said reservoirs for selectively opening one or the other of said reservoirs to the conduit means depending upon which pressure in the respective reservoirs predominates, and a leveling valve device carried by said sprung portion and interposed in said conduit means between said check valve device and said air spring means for so controlling the pressure of fluid in said air spring means, as to cause the air spring means to support said sprung portion at a preselected height relative to the unsprung portion irrespective of the load.

2. In a railway vehicle of the type having an air brake system including a reservoir normally charged with fluid under pressure from which said fluid under pressure may be supplied to effect a brake application on the vehicle, the arrangement for furnishing fluid under pressure to charge an air spring suspension system for the vehicle comprising the combination with said reservoir of a second reservoir, independent compressor means on the vehicle for charging said second reservoir, a conduit through which fluid under pressure may be supplied to charge the air spring suspension system, a double check valve opposingly subjected to the pressures of fluid in said reservoir and said second reservoir and which operates responsively to the predominating pressure of fluid in either of said reservoirs to selectively connect that reservoir having the predominating pressure to the said conduit.

References Cited in the file of this patent

UNITED STATES PATENTS

| | | |
|---|---|---|
| 564,863 | Beemer | July 28, 1896 |
| 779,858 | Lillie | Jan. 10, 1905 |
| 1,199,840 | Turner | Oct. 3, 1916 |
| 1,469,585 | McCune | Oct. 2, 1923 |
| 2,393,425 | Sexton | Jan. 22, 1946 |
| 2,691,420 | Fox et al. | Oct. 12, 1954 |
| 2,942,917 | Swander | June 28, 1960 |

FOREIGN PATENTS

| | | |
|---|---|---|
| 762,772 | Germany | July 26, 1951 |